Feb. 15, 1944.        J. T. WEBB        2,341,748
BATTERY CABLE CONNECTOR
Filed Jan. 31, 1942
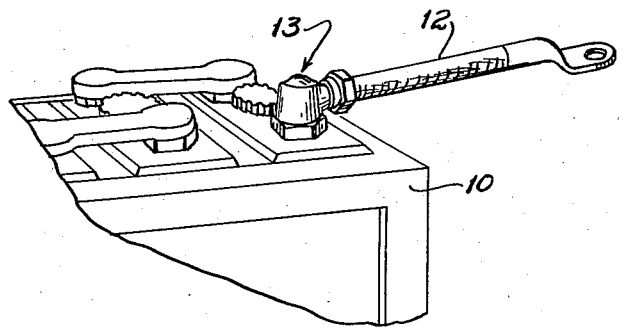
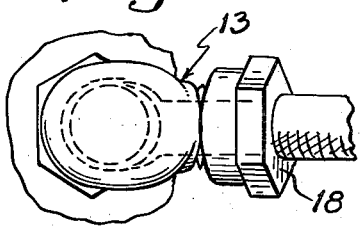
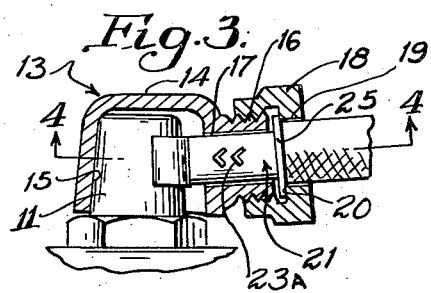
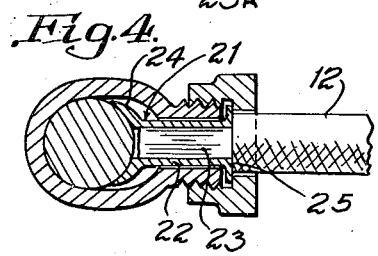
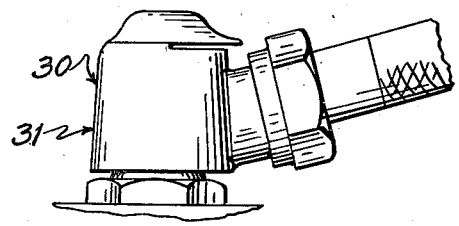
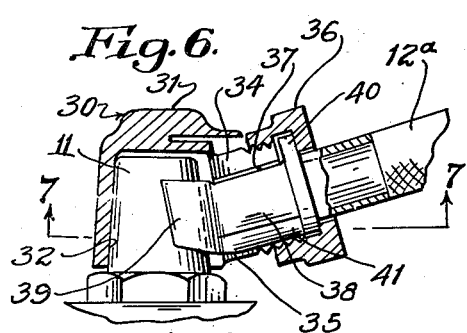
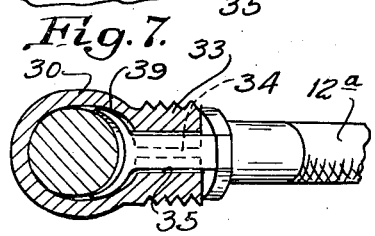
INVENTOR.
James T. Webb
BY
C. Lauren Maltby
ATTORNEY.

Patented Feb. 15, 1944

2,341,748

UNITED STATES PATENT OFFICE 2,341,748

BATTERY CABLE CONNECTOR

James T. Webb, South Gate, Calif.

Application January 31, 1942, Serial No. 429,027

1 Claim. (Cl. 173—259)

This invention relates to electrical fittings and more particularly to improvements in cable terminals or connectors for battery posts.

An object of the invention is to provide a simple, practical and inexpensive battery cable connector.

Another object is to provide an improved battery cable connector adapted to cover and protect the battery post, and one that will securely connect the cable thereto and minimize corrosion thereof, thereby eliminating air circulation, covering cap and eliminates foreign matter from collection on battery post.

Another object is to provide a novel battery cable connector that may be secured to the cable without soldering or welding.

Other objects and advantages will appear and be brought out more fully in the following specification, reference being had to the accompanying drawing wherein Fig. 1 is a perspective view of the top of a battery showing a connector comprising my invention connected thereto.

Fig. 2 is a top view of the connector shown in Fig. 1.

Fig. 3 is an elevation in central section of the same.

Fig. 4 is a sectional view taken along the line 4—4 of Fig. 3.

Fig. 5 is an elevation view of a modified form of my invention.

Fig. 6 is a view in sectional elevation of the same and

Fig. 7 is a sectional view taken along the line 7—7 of Fig. 6.

Referring more particularly to the drawing I show a battery 10 having an upstanding post 11 and a cable 12 connected thereto by connector 13 embodying a form of my invention. Connector 13 comprises a cap portion 14 having a post recess 15, a threaded shank 16 having a bore 17 and a locking-nut 18 having a cable bore 19 and a shoulder 20. A clamping member 21 clamps on the connector and comprises a tubular portion 22 adapted to be slidable in bore 17 and to be secured in any suitable manner to the end portion 23 of cable 12 in electrical connection therewith such as by pressed-in prongs 23—A. Clamping member 21 has a pair of arcuately-shaped end portions 24 for engaging post 11 and a flanged portion 25 adapted to be engaged by shoulder 20 of locking-nut 18 as described. End portions 24 are in substantial proximity in order to be passed through bore 17 and are then bent outwardly as shown in Fig. 4 to form the post-engaging shank. Member 21 is preferably of copper or equivalent material. It will be clear that clamping member 21 is advanced against post 11 making a firm and secure contact therewith when locking-nut 18 is tightened, shoulder 20 bearing against flanged portion 25 of member 21.

In Figs. 5 to 7 I show a modified form of the invention comprising a connector 30 having a battery post cap portion 31 provided with a post recess 32, a threaded shank 33 which is split, forming a narrow groove 34 at the top and a wide groove 35 at the bottom. A locking-nut 36 is provided for shank 33 which has a bore 37 for clamping member 38 reciprocable therein and provided with an arcuately-shaped end portion 39 and a flange 40 for locking-nut 36. Member 38 is molded on the cable 12—A, shank 33 has a depending fin 41 which extends into groove 35 which prevents the shank from turning when locking-nut 36 is tightened. When locking-nut 36 is tightened end portion 39 is pressed against post 11 and the split portions of shank 33 are firmly clamped to the side portions of clamping member 38. In the form of invention shown in Figs. 5 to 7 shank 34 and clamping member 38 are shown formed at a substantial angle of inclination in order to provide substantial clearance between cable 12—A and the filling caps of the battery or other parts thereof at the top.

From the foregoing description it will be clear that by my invention I have provided a battery cable connector which is easy to put on and take off and no frozen joints result and that corrosion of the post and cable connection is eliminated and foreign matter is kept from these parts.

Having described my invention what I claim is:

A device of the character described comprising a shank provided with a cylindric bore and a cap recess at one end thereof, a cylindric clamping member reciprocable in said bore having a pair of bendable end portions adapted to be passed through said bore and bent outwardly to engage a battery post wider than said bore with semi-circular contact, said clamping member having a shoulder and a cable bore, and a locking-collar for said clamping member shoulder and said shank and having threaded engagement with said shank adapted when advanced in said threaded engagement to cause locking pressure engagement of said clamping member with said post.

JAMES T. WEBB.